May 4, 1926.
N. L. ABERCROMBIE
1,583,434
BOLL WEEVIL EXTERMINATING MACHINE
Filed April 16, 1925    2 Sheets-Sheet 1
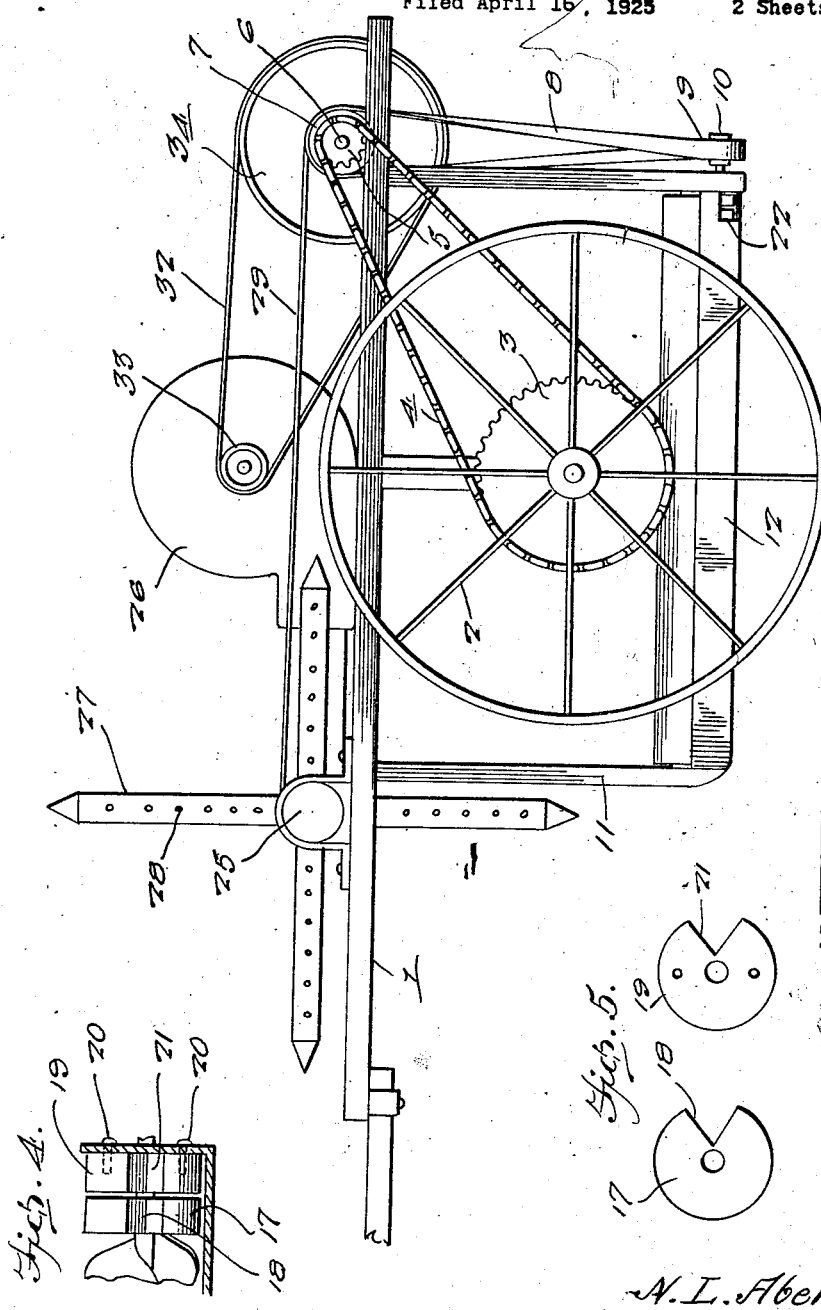
Inventor
N. L. Abercrombie
By Clarence A. O'Brien
Attorney

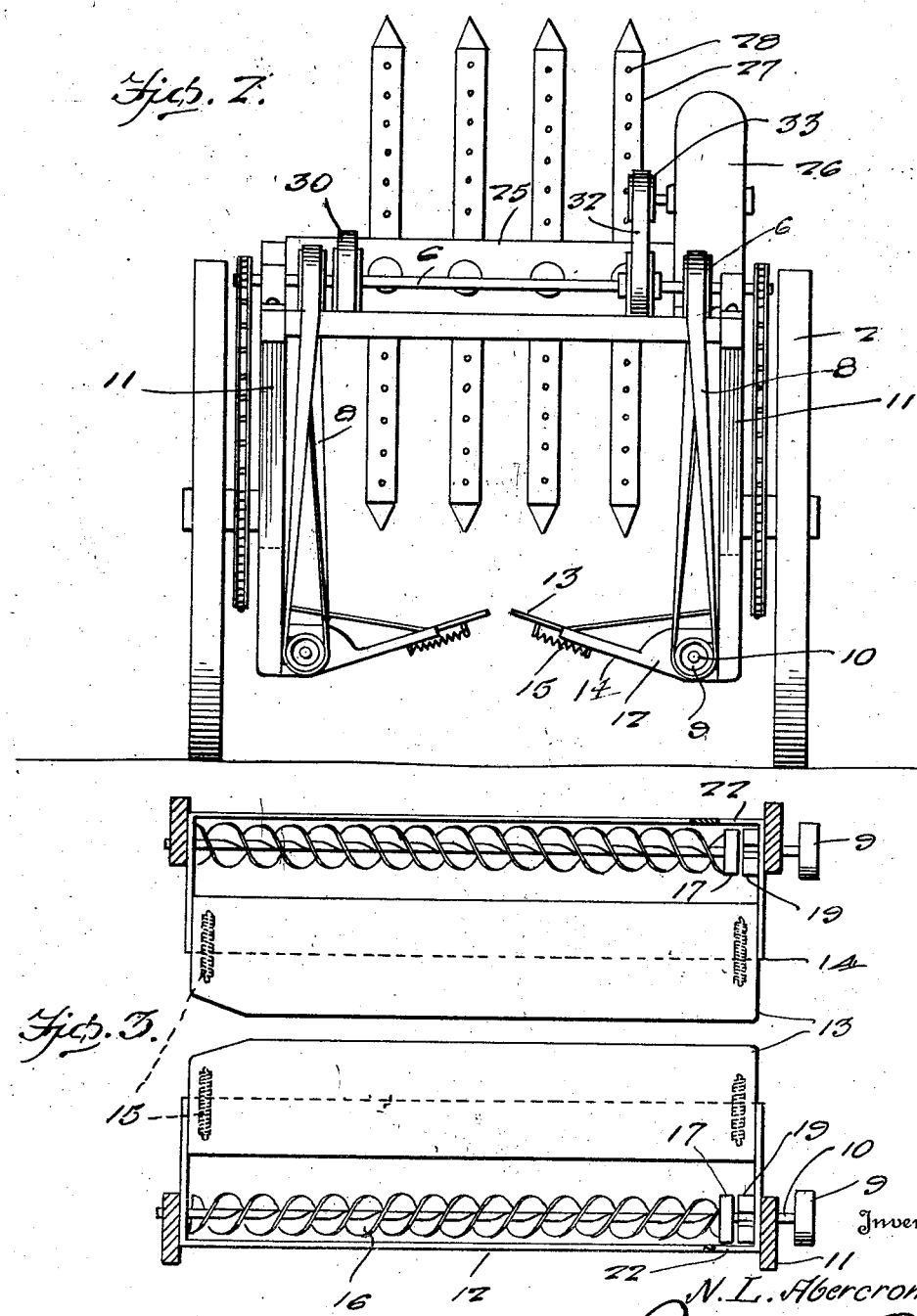

Patented May 4, 1926.

1,583,434

UNITED STATES PATENT OFFICE.

NEWTON LEONIDAS ABERCROMBIE, OF DREW, MISSISSIPPI, ASSIGNOR OF ONE-HALF TO ANDREW M. CARGILE, OF SUMMERLAND, MISSISSIPPI.

BOLL-WEEVIL-EXTERMINATING MACHINE.

Application filed April 16, 1925. Serial No. 23,588.

*To all whom it may concern:*

Be it known that I, NEWTON L. ABERCROMBIE, a citizen of the United States, residing at Drew, in the county of Sunflower and State of Mississippi, have invented certain new and useful Improvements in Boll-Weevil-Exterminating Machines, of which the following is a specification.

The present invention relates to boll weevil exterminating machines, and has for its principal object to improve generally upon the structure shown in the patent issued to me on March 25, 1924, Number 1,488,140.

A specific object of the invention is to provide in a boll weevil exterminating machine efficient means for killing the boll weevil.

With the above and numerous other objects in view, as will appear as the description proceeds, the invention resides in certain novel features of construction, and in the combination and arrangement of parts, as will be more fully described and claimed.

In the drawing:

Figure 1 is a side elevation of the machine embodying the features of my invention.

Figure 2 is a rear elevation thereof.

Figure 3 is a horizontal section taken therethrough, looking downwardly.

Figure 4 is an enlarged detail view, showing the killing means for the boll weevil, and Figure 5 is a detail view, showing in elevation, the two destroying blocks.

Referring to the drawings in detail, it will be seen that 1 designates a frame mounted in any suitable manner on ground wheels 2, which have sprockets 3 rotatable therewith for driving chains 4, trained over sprockets 5 on the ends of shafts 6. A pair of pulleys 7 are mounted on this shaft 6 to rotate therewith, and have belts 8 trained thereover. These belts 8 are also trained over pulleys 9 on shaft 10. The frame 1 is provided with depending members 11 which support troughs 12, one at each side of the machine, running longitudinally therewith. Plates 13 are slidable in the inner upwardly inclined extensions 14 of the trough 12 and springs 15 are associated therewith for normally holding them extended adjacent each other. The machine is adapted to be moved so that the plants will be disposed between the adjacent edges of the plates 13 and should the plants be thick they will have a tendency to separate the plates by compressing the springs 15. Auger conveyors 16 are formed on the shaft 10, adjacent the longitudinally extending outer sides of the trough. Thus the boll weevils which are knocked onto these plates 13 will roll down into the trough and conveyed to the rear ends thereof. A circular block 17 is mounted on the shaft 10, and is provided with a notch 18, to which the boll weevils will be led by the auger 16. A block 19 is fixed to the end of the trough and the shaft 10 extends therethrough. This block 19 is fixed in place, by means of screws 20 or any other suitable fastening elements. The block 19 is provided with a notch 21, and thus the boll weevils will be cut to pieces by the notches 18 and 21 of the blocks 17 and 19, respectively, since one rotates with respect to the other. After the boll weevils have been thus cut to pieces and crushed, they will be ejected through exits or openings 22 provided in the troughs at their rear end.

The means for knocking the boll weevils from the plants onto the plates 13 is identical with that shown in my patent above referred to, and for the purpose of clearness will be described somewhat generally. The numeral 25 represents a tube journaled on the frame and connected with a suitable blower 26 in any desired manner. Hollow fingers 27 radiate from the tube 25 and are perforated as at 28. The tube 25 is rotated by a belt 29 trained over a pulley 30 on the shaft 6. The blower is operated by a belt 32 trained over the pulley 33 on the shaft of the blower and the pulley 34 on the shaft 6.

The operation, construction, and advantages of this invention will now be clearly understood, by those skilled in this art, without a more detailed description, and particularly when taken in connection with my patent previously referred to. It is apparent that numerous changes in the details of construction, and in the combination and arrangement of parts may be resorted to, without departing from the spirit or scope of the invention as hereinafter claimed, or sacrificing any of its advantages.

Having thus described my invention, what I claim as new is:

A boll weevil exterminating device including a trough, an auger rotatably mounted in the trough, a block rotatable with the auger at the delivery end thereof, a stationary block in the trough adjacent the first block, both of said blocks being notched, said trough provided with an exhaust opening adjacent the blocks and the bottom of said trough being inclined toward the auger, a plate slidable over and beyond the end of said bottom, and spring means for normally holding said plate extended.

In testimony whereof I affix my signature.

NEWTON LEONIDAS ABERCROMBIE.